(12) United States Patent
Tordini

(10) Patent No.: US 9,562,670 B2
(45) Date of Patent: Feb. 7, 2017

(54) ILLUMINATION SYSTEM, LUMINAIRE, COLLIMATOR, AND DISPLAY DEVICE

(71) Applicant: KONINKLIJKE PHILIPS N.V., Eindhoven (NL)

(72) Inventor: Giorgia Tordini, Lyons (FR)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 164 days.

(21) Appl. No.: 14/291,039

(22) Filed: May 30, 2014

(65) Prior Publication Data

US 2014/0268641 A1 Sep. 18, 2014

Related U.S. Application Data

(63) Continuation of application No. 13/120,325, filed as application No. PCT/IB2009/054090 on Sep. 18, 2009, now Pat. No. 8,752,994.

(30) Foreign Application Priority Data

Sep. 25, 2008 (EP) .................................. 08165105

(51) Int. Cl.
| | |
|---|---|
| *F21V 9/16* | (2006.01) |
| *F21V 13/04* | (2006.01) |
| *F21V 5/04* | (2006.01) |
| *F21W 131/405* | (2006.01) |
| *F21Y 101/00* | (2016.01) |

(52) U.S. Cl.
CPC ................. *F21V 13/04* (2013.01); *F21V 5/04* (2013.01); *F21W 2131/405* (2013.01); *F21Y 2101/00* (2013.01)

(58) Field of Classification Search
CPC ...... F21V 13/04; F21V 5/04; F21W 2131/405; F21Y 2101/02
USPC ............................ 362/97.1, 237, 311.12, 351
See application file for complete search history.

(56) References Cited

U.S. PATENT DOCUMENTS

| 3,497,687 A | 2/1970 | Hermann |
| 6,481,130 B1 | 11/2002 | Wu |
| 8,231,256 B1 | 7/2012 | Coleman et al. |
| 2003/0076034 A1 | 4/2003 | Marshall et al. |

(Continued)

FOREIGN PATENT DOCUMENTS

| CN | 1874093 | 12/2006 |
| DE | 102005019832 A1 | 9/2006 |

(Continued)

*Primary Examiner* — Karabi Guharay
*Assistant Examiner* — Jessica M Apenteng

(57) ABSTRACT

The invention relates to an illumination system (10), a luminaire (102), a collimator (30), and a display device (200). The illumination system according to the invention comprises a light source (20) and the collimator. The light source is configured to emit a substantially Lambertian light distribution around an axis of symmetry (22). The refractive collimator is configured to redirect light from the light source so as to at least partially illuminate an illuminating surface (50), in which at least a part of the illuminating surface is substantially parallel to the axis of symmetry. The refractive collimator comprises a concave entrance window (34) and an at least partially convex exit window (40) for refracting light towards the illuminating surface.
The illumination system according to the invention has the effect that a height of the illumination system may be reduced by virtue of the use of the refractive collimator.

18 Claims, 5 Drawing Sheets

(56) References Cited

U.S. PATENT DOCUMENTS

| 2003/0099115 A1 | 5/2003 | Reill |
| 2007/0081329 A1 | 4/2007 | Chua et al. |
| 2007/0081361 A1 | 4/2007 | Clary |
| 2007/0171676 A1 | 7/2007 | Chang |
| 2008/0291683 A1 | 11/2008 | Chinniah et al. |
| 2009/0196071 A1 | 8/2009 | Matheson et al. |

FOREIGN PATENT DOCUMENTS

| JP | 2003209288 | | 7/2003 |
| JP | 2008518473 | A | 5/2008 |
| WO | 2007016363 | A2 | 2/2007 |
| WO | 2007054889 | A2 | 5/2007 |

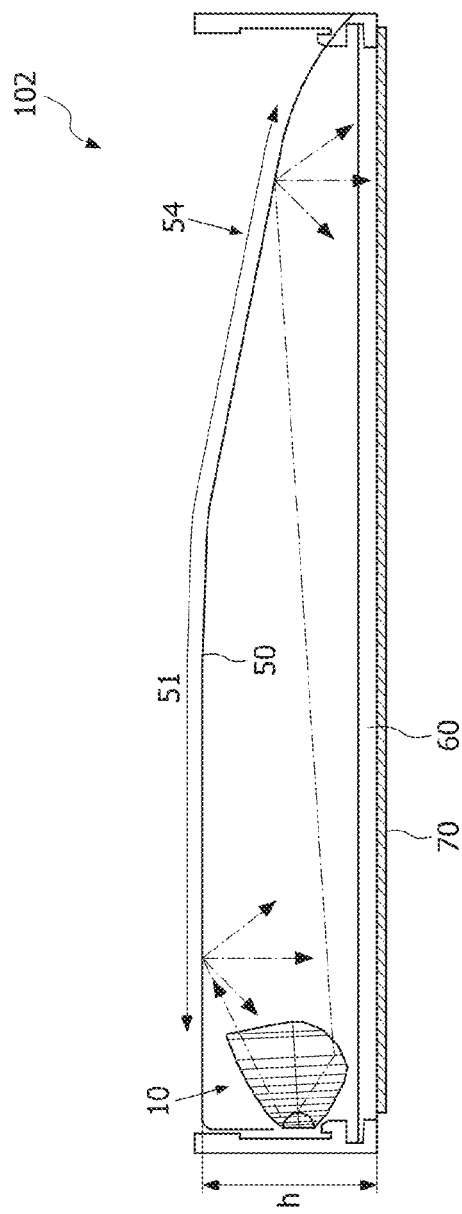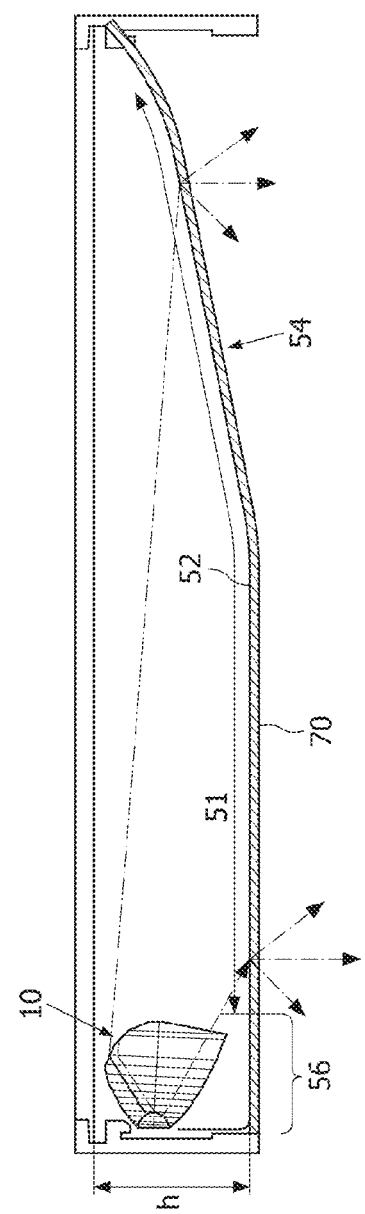
FIG. 2A
FIG. 2B

FIG. 4A
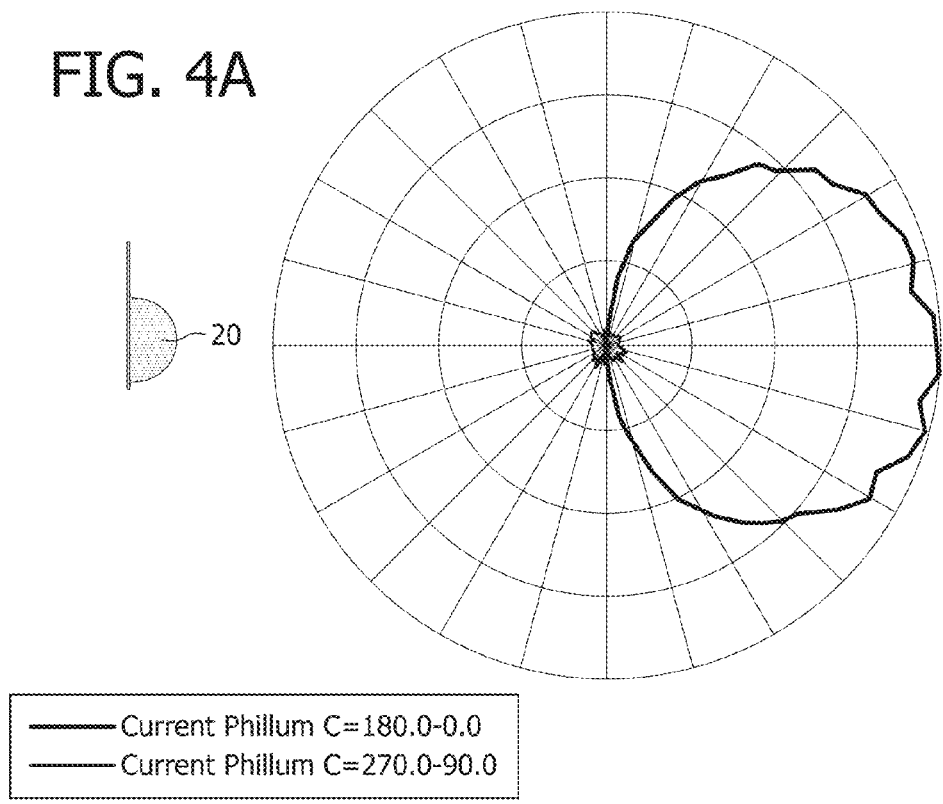
— Current Phillum C=180.0-0.0
— Current Phillum C=270.0-90.0
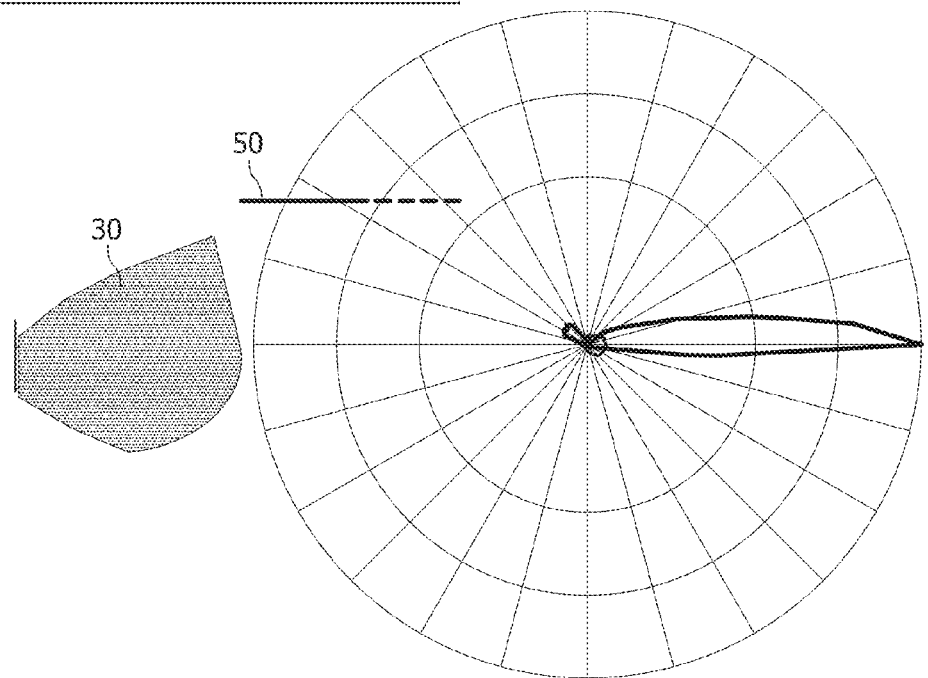
FIG. 4B

ILLUMINATION SYSTEM, LUMINAIRE, COLLIMATOR, AND DISPLAY DEVICE

CROSS REFERENCE TO RELATED APPLICATIONS

This is a continuation of prior application Ser. No. 13/12 325 filed Mar. 22, 2011, now U.S. Pat. No. 8,752,994 which is a 371 of PCT/IB2009/054090 filed Sep. 18, 2009 and which claims foreign priority from EP08165105.1 filed Sep. 25, 2008.

FIELD OF THE INVENTION

The invention relates to an illumination system comprising a light source and a collimator.

The invention also relates to a luminaire comprising the illumination system according to the invention. The invention also relates to a collimator for use in the illumination system according to the invention and/or in the luminaire according to the invention. The invention also relates to a display device comprising the luminaire according to the invention as a backlighting system.

BACKGROUND OF THE INVENTION

Such illumination systems are known per se. They are used, inter alia, in luminaires for general lighting purposes, for example, for office or shop lighting or, for example, as shop window lights. Alternatively, these illumination systems are used for lighting (transparent or semi-transparent) plates of glass or (transparent) synthetic resin on which items, for example, jewelry are displayed. The illumination systems are also used for illuminating advertising boards, for example, advertising boards illuminating a partially transparent image from the back of the image.

The known illumination systems may also be used as light sources in backlighting systems in (picture) display devices, for example, for TV sets and monitors. Such illumination systems are particularly suitable for use as backlighting systems for non-emissive displays such as liquid crystal display devices, also denoted LCD panels, which are used in (portable) computers or (portable) telephones.

Recently, illumination systems comprising a light source having a substantially Lambertian emission profile, for example, light-emitting diodes (further also referred to as LEDs) have been more frequently used in general lighting applications, such as luminaires. Use of LEDs in luminaires has the advantage that the LEDs have a relatively high efficiency. Furthermore, there is a vast range of available LEDs for use in general light applications, offering excellent freedom of design with respect to emitted colors and aesthetic design of the luminaire. However, use of LEDs has the drawback that the light-emitting surface is typically relatively small and that light emitted from this relatively small surface has a high intensity. To prevent glare, it is important to shield a user of the luminaire from this light-emitting surface. Glare results from excessive contrast between bright and dark areas in the field of view. Glare can result, for example, from directly viewing a filament of an unshielded or badly shielded light source. Particularly when LEDs are used, direct view into the LEDs by a user near the luminaire should be prevented so as to reduce glare and improve the user's visual comfort. A luminaire comprising LEDs as a light source is known from, for example, WO 2007/054889. In this luminaire, the light emitted by the LEDs is emitted via a back-reflector so as to reduce glare and improve the uniformity of the light emitted from the luminaire. The known luminaire has the drawback that it has a relatively large height.

OBJECT AND SUMMARY OF THE INVENTION

It is an object of the invention to provide an illumination system having a reduced height.

According to a first aspect of the invention, the object is achieved with an illumination system as defined in claim 1. According to a second aspect of the invention, the object is achieved with a luminaire as defined in claim 7. According to a third aspect of the invention, the object is achieved with a collimator as defined in claim 14. According to a fourth aspect of the invention, the object is achieved with a display device as defined in claim 15.

The illumination system according to the first aspect of the invention comprises a light source for emitting light with a basic emission distribution around an axis of symmetry, and a collimator for redirecting light from the light source so as to substantially homogeneously illuminate at least a part of an illuminating surface, at least a part of the homogeneously illuminated illuminating surface extending substantially parallel to the axis of symmetry, the collimator comprising a concave entrance window for receiving light from the light source, and further comprising an at least partially convex exit window for directing light towards the illuminating surface, a convex part of the exit window being shaped for refracting light emitted by the light source in a direction away from the illuminating surface and back towards the illuminating surface, and for generating an altered emission distribution which is asymmetric with respect to the axis of symmetry of the basic emission distribution so as to substantially homogeneously illuminate the at least part of the illuminating surface.

The illumination system according to the invention has the effect that the combination of light source and collimator enables the illumination system to substantially homogeneously illuminate at least a part of the illuminating surface which is arranged substantially parallel to the axis of symmetry. Generally, a LED has a substantially Lambertian emission profile. Such a profile of a light source does not result in a substantially uniform distribution of the light across an illuminating surface which is at least partially arranged parallel to the axis of symmetry of the Lambertian emission profile. In the known illumination system, a mirror is used to reflect light from the light source towards the illuminating surface. Such a mirror may be shaped, for example, in such a way that the substantially Lambertian distribution of the LED is at least partially converted to a homogeneous distribution across the illuminating surface. However, use of such a mirror typically increases the dimensions of the illumination system. In the illumination system according to the invention, use of the collimator generates an asymmetric emission profile which illuminates the illuminating surface substantially homogeneously, thus precluding the need for a mirror. Consequently, the height of the illumination system may be reduced.

Use of the collimator substantially improves the freedom of design in that a substantially uniform illumination of the part of the illuminating surface is obtained. The collimator may be manufactured with relatively high accuracy, for example, by using well-known molding techniques. Particularly the shape of the exit window, which is partially used for refracting light back towards the illuminating surface, may be produced in a relatively easy way and in substantially any shape, which significantly improves the freedom of design as compared to the known illumination system. In the known illumination system, the shape of the mirror is often relatively difficult to make and may often require an excessive height of the illumination system to generate the required light distribution, which limits the freedom of design in the known illumination system.

Use of the illumination system according to the invention, comprising a LED as a light source, has the further advantage that a base of the LED is arranged substantially perpendicular to the illuminating surface. Such an arrangement of the base of the LED allows substantially full illumination of the illuminating surface. In the known illumination system, the base of the LED is substantially parallel to the illuminating surface. In such a known arrangement, the base of the LED typically generates a shadow at the illuminating surface (below the LED) which cannot be illuminated by the LED. When the illumination system according to the invention is used, the arrangement of the LED enables the whole illuminating surface to be illuminated by the light of the LED. When the collimator is a refractive collimator, light may leak from the refractive collimator at different surfaces than the exit window, which generates stray light. This stray light may be used advantageously to illuminate the remainder of the illuminating surface.

Use of a refractive collimator in the illumination system according to the invention has the even further advantage that it improves the efficiency of the illumination system. In the known illumination system, a mirror is used to generate a substantially homogeneous light distribution. However, use of the mirror generally introduces reflection losses which reduce the efficiency of the known illumination system. Use of the refractive collimator in the illumination system according to the invention precludes the mirror, thus preventing the reflection losses and hence improving the efficiency of the illumination system according to the invention as compared to the known illumination systems.

Collimators are often used to convert light from, for example, a Lambertian emission distribution to a substantially parallel beam of light. However, particularly when an illuminating surface arranged partially parallel to the axis of symmetry of the Lambertian distribution is illuminated, the emission distribution from the known collimators is typically not uniform. The collimator according to the invention comprises an at least partially convex exit window for refracting light towards the illuminating surface. A shape of the at least partially convex exit window is chosen to be such that an emission distribution, which is substantially homogeneous, is generated at the illuminating surface. This is achieved by the asymmetric emission distribution from the exit window of the refractive collimator according to the invention, which is obtained by virtue of the at least partially convex exit window of the collimator.

The shape of the at least partially convex exit window may be determined by means of, for example, optical modeling software, also known as ray-tracing programs, such as ASAP®, lighttools®, etc.

The collimator is arranged in such a way that, in operation, part of the illuminating surface is illuminated substantially homogeneously. At least a part of the illuminating surface is arranged substantially parallel to the axis of symmetry of the emission profile of the light source. The phrase "at least a part of the illuminating surface is arranged substantially parallel to the axis of symmetry of the emission profile" is hereinafter understood to mean that there may be an angle within a range of ±10 degrees between the axis of symmetry of the emission profile of the light source and the part of the illuminating surface. The illuminating surface is preferably parallel to the axis of symmetry of the emission profile of the light source. In such an arrangement, the range through which the light spreads across the illuminating surface may be largest. In such a configuration, the base of the light source, for example, a LED, is arranged substantially perpendicularly to the at least part of the illuminating surface. At a far end of the illuminating surface, relatively far away from the collimator, the illuminating surface may be curved slightly towards the axis of symmetry so as to allow a uniform light distribution also at a relatively large distance from the collimator. Alternatively, the light source (together with the collimator) may be tilted through a relatively small angle, for example, up to 10 degrees towards the illuminating surface. Such a tilt of the light source and collimator generally requires an adaptation of the at least partially convex exit window of the collimator so as to ensure a uniform light distribution across the illuminated part of the illuminating surface.

In an embodiment of the illumination system, the collimator comprises an edge wall arranged between the entrance window and the exit window, said edge wall being arranged, between the entrance window and a boundary edge, substantially symmetrically around a further axis of symmetry and having a substantially parabolic shape in a cross-section through the further axis of symmetry. This embodiment has the advantage that, in the case of a refractive collimator, the substantially parabolic shape of the edge wall of the refractive collimator allows guidance of the light through the refractive collimator via total internal reflection. Reflection inside the refractive collimator via total internal reflection is a substantially lossless reflection, and use of the substantially parabolic shape of the edge wall of the refractive collimator thus allows substantially lossless guidance of the light from the entrance window to the exit window.

In another embodiment of the illumination system, the further axis of symmetry of the collimator and the axis of symmetry of the emission distribution intersect substantially at a focal point of the concave entrance window, wherein the further axis of symmetry is tilted through a tilting angle with respect to the axis of symmetry of the emission distribution. The further axis of symmetry is preferably tilted towards the illuminating surface, thus tilting the parabolic edge wall of the refractive collimator. This embodiment has the advantage that guidance via total internal reflection already progresses towards the illuminating surface. The part of the convex exit window which is shaped to refract light towards the illuminating surface may therefore be reduced. The tilt of the parabolic edge wall has the further advantage that it reduces light to be emitted by the collimator away from the illuminating surface. The illumination system may be arranged, for example, in a luminaire in which the illuminating surface is a diffusely reflective surface reflecting the light from the collimator towards a light emission window of the luminaire. Such a light emission window is typically arranged opposite the illuminating surface. In such a configuration, light from the light source should preferably not directly illuminate the light emission window of the luminaire, as this direct illumination of the light emission window may cause glare. The light is generally guided towards the illuminating surface by tilting the further axis of symmetry towards the illuminating surface, thus reducing the emission of light away from the illuminating surface and towards the light emission window, and hence reducing glare.

In a further embodiment of the illumination system, the further axis of symmetry is tilted with respect to the axis of symmetry towards the illuminating surface, wherein the tilting angle between the further axis of symmetry and the axis of symmetry is in a range between 0.5 and 10 degrees. The angle between the further axis of symmetry and the axis of symmetry is a trade-off between the redirection of the light towards the illuminating surface and the leakage of light via the edge wall of the refractive collimator after multiple reflections. This light may be used to illuminate the illuminating surface up to the edge of the illuminating surface. Still, the intensity of this leakage of the light should be limited so as to maintain a substantially homogeneous illumination of the illuminating surface. As such, the predefined angle between the further axis of symmetry and the axis of symmetry may be preferably between 1 and 5 degrees in a preferred embodiment. In a further preferred embodiment, the angle between the further axes of symmetry may be between 2.5 and 3.5 degrees. The inventors have found that an angle of approximately 3 degrees is preferred as it provides a substantial reduction of glare while providing sufficient illumination at the edge of the illuminating surface when using a refractive collimator.

In yet another embodiment of the illumination system, a first part of the exit window comprises a substantially planar part of the exit window, the first part being arranged substantially between a first plane and the illuminating surface, the first plane extending through the further axis of symmetry and being arranged substantially perpendicularly to a second plane extending through the axis of symmetry and the further axis of symmetry, wherein a second part of the exit window arranged at a side of the first plane opposite to the illuminating surface comprises the convex part of the exit window for refracting light towards the illuminating surface. Based on the ray-tracing program, the part of the exit window between the first plane and the illuminating surface may be designed to be relatively planar so as to still generate a substantially homogeneous distribution with the light emitted from that part of the exit window. The remainder of the exit window is used to redirect light, which would otherwise be emitted away from the illuminating surface, back to the illuminating surface. To achieve such a refractive behavior, the remainder of the exit window is curved substantially convexly (as is illustrated in FIG. 1B) before intersecting with the edge wall.

In a further embodiment of the illumination system, the exit window is substantially symmetric relative to the second plane extending through the axis of symmetry and the further axis of symmetry.

According to a second aspect of the invention, the object is achieved with a luminaire comprising an illumination system and the illuminating surface.

One embodiment of the luminaire comprises a plurality of illumination systems, each comprising a light source and a collimator for illuminating a part of the illuminating surface. The plurality of illumination systems is jointly arranged to illuminate the illuminating surface substantially homogeneously.

In another embodiment of the luminaire, the plurality of light sources is arranged in a row of light sources, wherein the individual parts illuminated by the individual illumination systems partially overlap, the distribution of the light of the individual illumination systems being arranged to generate a substantially uniform light distribution across the illuminating surface. The intensity at the overlapping part of the individual light distributions of the individual illumination system is reduced so as to obtain an overall substantially uniform light distribution across the illuminating surface. This may be designed by means of well-known optical modeling software. Using such an arrangement, a very large luminaire having a substantially homogeneously illuminated illuminating surface can be obtained.

In a further embodiment of the luminaire, a part of the illuminating surface is a curved surface which is concavely shaped with respect to the collimator. The concave shape of the illuminating surface with respect to the collimator is illustrated in FIGS. 2A and 2B. This embodiment has the advantage that it allows an increase of the part of the illuminating surface which is illuminated by the light emitted by the collimator while maintaining the ability to have a substantially homogeneous illumination across the part of the illuminating surface. At a relatively large distance from the collimator, the angle at which the light emitted by the collimator strikes the illuminating surface is relatively large (with respect to a normal axis at the illuminating surface), making it very difficult to obtain a uniform light distribution. By curving the far end of the illuminating surface towards the axis of symmetry, the angle at which the light emitted by the refractive collimator strikes the part of the illuminating surface is reduced (measured with respect to the normal at the illuminating surface, thus closer to the normal at the illuminating surface), making it easier to obtain a relatively homogeneous light distribution at this far end of the illuminating surface. Furthermore, the curvature allows a reduction of the height of the luminaire at the far end of the illumination surface with respect to the collimator.

In yet another embodiment of the luminaire, the illuminating surface is a reflective surface arranged substantially opposite a light emission window of the luminaire. In such an embodiment, the reflective surface may be arranged, for example, to substantially diffusely reflect light towards the light emission window of the luminaire. This arrangement improves the mixing of the light due to the distance between the illuminating surface and the emission window. Alternatively, the reflective surface may be a substantially specularly reflective surface and the light emission window may comprise, for example, a diffusing layer for diffusing the light before it is emitted by the luminaire. The shape of this reflective illuminating surface is less critical for generating a uniform distribution of the light at the light emission window, thus still resulting in less height as compared to the known illumination system.

A further embodiment of the luminaire comprises a light emission window comprising the illuminating surface. In such an embodiment, the light emitted and refracted by the refractive collimator impinges directly on the light emission window of the luminaire. The light emission window preferably comprises a diffusely translucent layer for diffusing the light before it is emitted by the luminaire. Such an arrangement is preferred because it generally allows realization of the smallest height of the luminaire and precludes an additional reflective surface.

In a further embodiment of the luminaire, the illuminating surface and/or the light emission window comprise a luminescent material for converting at least a part of the light emitted by the light source to light of a different color. This embodiment has the advantage that the use of the luminescent material allows producing any color of light emitted by the luminaire. Furthermore, the luminescent material may be used as a diffusing layer because, after having been absorbed by the luminescent material, the light is subsequently emitted by the luminescent material in a substantially Lambertian emission profile. Such an arrangement of the luminescent material is generally known as remote phosphor arrangement and has the advantage that luminescent materials can be chosen from a relatively large range and that the luminescent material has a relatively high efficiency, all due to the relatively low operating temperatures of the remotely arranged luminescent material and the relatively low energy flux through the luminescent material.

BRIEF DESCRIPTION OF THE DRAWINGS

These and other aspects of the invention are apparent from and will be elucidated with reference to the embodiments described hereinafter.

In the drawings:

FIGS. 2A and 2B are schematic cross-sectional views of a luminaire comprising the illumination system according to the invention, FIGS. 4A and 4B show polar plots of the light distribution of the light-emitting diode and the light-emitting diode in combination with the collimator.

The Figures are purely diagrammatic and not drawn to scale. Particularly for clarity, some dimensions are strongly exaggerated. Similar components in the Figures are denoted by the same reference numerals as much as possible.

DESCRIPTION OF EMBODIMENTS

Figure 1A:
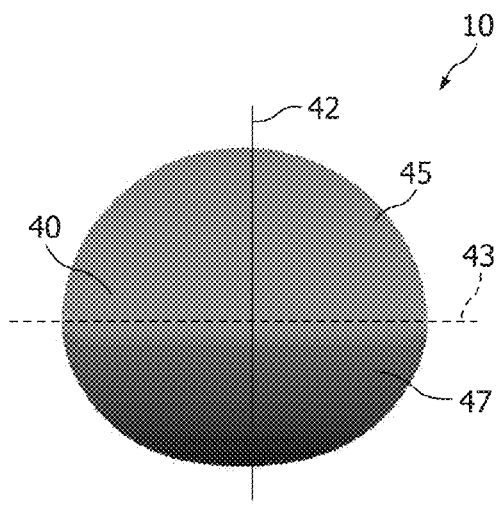
FIGS. 1A, 1B and 1C are a schematic front view, a cross-sectional view and a rear view, respectively, of an illumination system according to the invention.
Figure 1B:
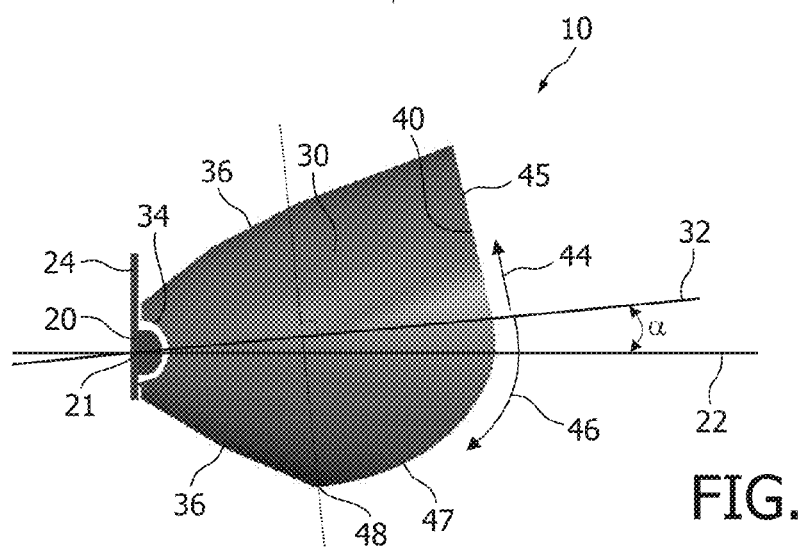
Figure 1C:
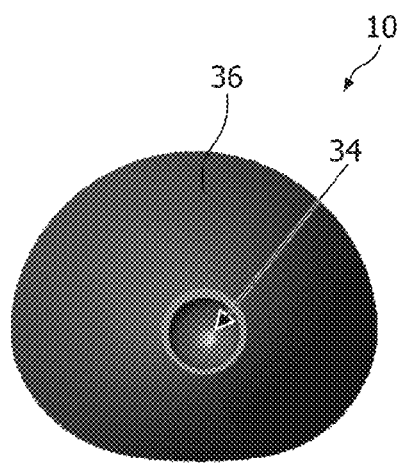

FIGS. 1A, 1B and 1C are a schematic front view (FIG. 1A), a cross-sectional view (FIG. 1B) and a rear view (FIG. 1C) of an illumination system 10 according to the invention. The illumination system 10 comprises a light source 20 (see FIG. 1B) and a collimator 30, preferably a refractive collimator 30. The light source 20 emits light at a substantially Lambertian emission distribution arranged around an axis of symmetry 22. Such a light source 20 may be, for example, a light-emitting diode 20 (further also indicated as LED). The light emitted by the light-emitting diode 20 enters the refractive collimator 30 via a concave entrance window 34 and is emitted from the refractive collimator 30 at least partially via a light exit window 40. The concave entrance window 34 is preferably a substantially spherical entrance window 34 whose focal point 21 is located substantially at the center of the light source 20. Such an arrangement allows efficient coupling of the light emitted by the light source 20 into the refractive collimator 30. The exit window 40 is at least partially convex 47 and is shaped to refract part of the light emitted from the exit window towards an illuminating surface 50, 52 (see FIGS. 2A and 2B). In operation, the illumination system 10 illuminates at least a part 51 (see FIGS. 2A and 2B) of the illuminating surface 50, 52. This homogeneously illuminated part 51 of the illuminating surface 50, 52 is at least partially arranged substantially parallel to the axis of symmetry 22. The light emitted by the light source 20 and impinging on the illuminating surface 50, 52 via the refractive collimator 30 illuminates at least a part 51 of the illuminating surface 50, 52 substantially homogeneously. The shape of the exit window 40 is chosen to be such that the part 51 of the illuminating surface 50, 52 is illuminated substantially homogeneously. The specific shape for obtaining a predetermined homogeneous illumination of the part 51 of the illuminating surface 50, 52 may be determined by means of well-known optical modeling software, also known as ray-tracing programs, such as ASAP®, lighttools®, etc.

Use of the refractive collimator 30 for redirecting the light emitted by the LED 20 towards at least a part 51 of the illuminating surface 50, 52, at least a part of which is arranged substantially parallel to the axis of symmetry 22, generates additional freedom for a designer of such an illumination system 10. In the known illumination systems, the light of the LED is spread across a surface using a specifically shaped mirror. Use of the mirror has the drawback that the three-dimensional modeling of the reflective mirror is relatively difficult. Furthermore, the three-dimensional modeling of the reflective mirror may require extra height of the known illumination system so as to ensure that the reflective mirror illuminates the surface in a substantially uniform way. The illumination system 10 according to the invention comprises a refractive collimator 30 for redirecting the light emitted by the LED 20 so as to substantially uniformly illuminate part 51 of the illuminating surface 50, 52. The shape of the exit window 40 may be designed by means of the optical modeling software so as to refract at least a part of the light emitted by the LED 20 towards the illuminating surface 50, 52. Such a refractive collimator 30 may be produced by means of well-known molding techniques through which the refractive collimator 30 may be produced relatively easily in large numbers. Although the positioning of the refractive collimator 30 with respect to the illuminating surface 50, 52 is relatively critical to obtain a good uniformity across the part of the illuminating surface 50, 52, it still allows substantially any light distribution across the part 51 of the illuminating surface 50, 52 by just controlling the shape of the exit window 40 of the refractive collimator 30. When such a refractive collimator 30 is used in the illumination system 10, a height h (see FIGS. 2A and 2B) of the illumination system 10, which is a dimension of the illumination system 10 in a direction substantially perpendicular to the axis of symmetry 22, typically depends on the dimensions of the refractive collimator 30 in the direction parallel to the height h. This is typically smaller as compared to the height which would be required if the uniform distribution of the light were to be generated by means of a reflecting mirror—as is shown in the known illumination system. Consequently, the illumination system 10 according to the invention provides greater freedom for an optical designer to achieve a substantially uniform distribution of the light over a part 51 of the illuminating surface 50, 52 while limiting the height h of the illumination system 10.

An edge wall 36 is arranged between the entrance window 34 and the exit window 40. In between the entrance window 34 and a boundary edge 48, the edge wall 36 of the collimator is substantially symmetric around a further axis of symmetry 32. In a cross-sectional view through the further axis of symmetry 32 of the refractive collimator 30, the edge wall 36 has a substantially parabolic shape. Such a parabolic shape is used to guide light from the entrance window 34 to the exit window 40 of the refractive collimator 30 via total internal reflection. Since total internal reflection is substantially lossless, the guidance using total internal reflection provides a very efficient way of guiding light through the refractive collimator 30. The further axis of symmetry 32 and the axis of symmetry 22 intersect substantially at a focal point 21 of the concave entrance window 34, which point is substantially at the center of the LED 20. The further axis of symmetry 32 is tilted with respect to the axis of symmetry 22 through a predefined angle α around the point of intersection. The further axis of symmetry 32 is tilted through the predefined angle α in a direction of the illuminating surface 50, 52. Due to the tilt of the further axis of symmetry 32, light guided by the refractive collimator 30 is already guided more towards the illuminating surface 50, 52, thus reducing the light which may be emitted from the refractive collimator 30 away from the illuminating surface 50, 52. The predefined angle α is in a range between 0.5 and 10 degrees. The predefined angle α is preferably between 1 and 5 degrees, and more preferably between 2.5 and 3.5 degrees. The choice of the predefined angle α depends on a trade-off between the redirection of the light towards the illuminating surface 50, 52 and the leakage of light via the edge wall 36 of the refractive collimator 30, for example, after multiple reflections inside the refractive collimator 30 (shown in FIG. 3A). A part of the leaked light may be used to illuminate a part of the illuminating surface 50, 52 arranged near the refractive collimator 30 (see item 56 in FIG. 2B). Still, the intensity of this light leakage should be limited so as to maintain a substantially homogeneous illumination of the illuminating surface. The inventors have found that the predefined angle α of approximately 3 degrees is preferred as it provides sufficient illumination at the edge 52 of the illuminating surface 50, 52.

The exit window 40 of the refractive collimator 30 comprises a first part 44 and a second part 46 (see FIG. 1B). The first part 44 is substantially arranged between a first plane 43 and the illuminating surface 50, 52 and comprises a substantially planar part 45 of the exit window 40 of the refractive collimator 30. The first plane 43 extends through the further axis of symmetry 32 and is arranged substantially perpendicularly to a second plane 42 which extends through the axis of symmetry 22 and the further axis of symmetry 32. The second part 46 is arranged at a side of the first plane 43 opposite to the first part 44, and comprises a convexly curved part 47 of the exit window 40 for refracting light towards the illuminating surface 50, 52. The exit window 40 may further be arranged symmetrically with respect to the second plane 42 (see FIG. 1A) which extends through the axis of symmetry 22 and the further axis of symmetry 32.

FIGS. 2A and 2B are schematic cross-sectional views of a luminaire 102, 104 comprising the illumination system 10 according to the invention. The luminaire 102, 104 comprises the illumination system 10 and the illuminating surface 50, 52. As can be seen from the schematic cross-sectional views of the luminaires 102, 104 shown in FIGS. 2A and 2B, a part of the illuminating surface 50, 52 is arranged substantially parallel to the axis of symmetry 22. The wording "substantially parallel to the axis of symmetry" is chosen to indicate that the part of the illuminating surface 50, 52 may define an angle within ±10 degrees with the axis of symmetry 22. The illuminating surface 50, 52 is preferably parallel to the axis of symmetry 22 because the range through which the light spreads across the illuminating surface 50, 52 may be largest in such an arrangement. In such a configuration, a base 24 (see FIG. 1B) of the LED 20 is arranged substantially perpendicularly to the at least part of the illuminating surface 50, 52. At a far end of the illuminating surface 50, 52, relatively far away from the refractive collimator 30, the illuminating surface 50, 52 may be curved concavely with respect to the refractive collimator 10 (as shown in FIGS. 2A and 2B—denoted by reference numeral 54) so as to allow a uniform distribution of light also at a relatively large distance from the refractive collimator 30. Alternatively, the light source 20 (together with the refractive collimator 30) may be tilted through a relatively small angle, for example, up to 10 degrees towards the illuminating surface 50, 52. Such a tilt of the illumination system 10 generally requires an adaptation of the shape of the at least partially convex exit window 40 of the refractive collimator 30 so as to ensure a uniform distribution of light across the illuminated part of the illuminating surface 50. For example, the substantially planar first part 44 (see FIG. 1B) may also be curved (not shown) to refract light in such a way that the light across the illuminating surface 50, 52 has a substantially uniform distribution.

FIG. 2A shows a first embodiment of the luminaire 102 in which the illuminating surface 50 is a reflective surface 50 arranged substantially opposite a light emission window 60. The reflective surface 50 may comprise, for example, a diffusing layer 50 which reflects the impinging light from the illumination system 10 to diffusely reflected light towards the light emission window 60. As such, the distance between the reflective illuminating surface 50 and the light emission window 60 allows increased mixing of the light emitted by the luminaire 102.

FIG. 2B shows a second embodiment of the luminaire 104 in which the illuminating surface 52 coincides with the light emission window 60 of the luminaire 104. This configuration has the advantage that it typically allows the height h of the luminaire 104 to be further reduced. Furthermore, this embodiment may have a greater efficiency as no reflective surface is required to substantially homogeneously illuminate the illuminating surface 52. Some light is generally lost at each reflection. By arranging the refractive collimator 30 in such a way that the light emitted by the refractive collimator 30 substantially uniformly illuminates the illuminating surface 52, i.e. the light emission window 60, a reflection for coupling the light out of the luminaire 104 is prevented, thus improving the efficiency.

The light emission window 60 preferably comprises a diffusing layer or diffusing material for diffusing the light emitted by the luminaire 104.

In the embodiment of the illumination system 102, 104 as shown in FIGS. 2A and 2B, the illuminating layer 50, 52 and/or the light emission window 60 may comprise a layer 70 comprising a luminescent material 70, or it may comprise a mixture of a plurality of different luminescent materials 70. The luminescent layer 70 is further also indicated as remote phosphor layer 70. In the embodiment shown in FIG. 2A, the remote phosphor layer 70 is applied to the light emission window 60. This embodiment has the advantage that the remote phosphor layer 70 may be applied relatively easily, for example, before assembling the light emission window 60 to the illumination system 102. However, the luminance uniformity at the light emission window 60 is dependent to a relatively large extent on the uniformity of the luminescent material 70 in the remote phosphor layer 70. Alternatively, the luminescent material 70 may be arranged as a layer on the illuminating surface 50 of the luminaire 102 (not shown). In such an embodiment, the distance between the remote phosphor layer 70 and the light emission window 60 is relatively large, allowing mixing of the light generated by the luminescent material 70 before being emitted by the luminaire 102. In such an arrangement, the uniformity of the emitted light is less dependent on the uniformity of the luminescent material 70. As a further alternative, both the illumination surface 50 and the light emission window 60 comprise a luminescent material 70 (not shown) which may even be different (mixtures of) luminescent materials 70. The remote phosphor configuration has the advantage that it improves the efficiency of the luminescent material and increases the range of luminescent materials to choose from. Both advantageous effects of the remote phosphor configuration are caused by the fact that the operating temperature of the phosphor and the light flux through the phosphor are generally lower in the typical remote phosphor configuration than in the configuration in which the luminescent material is applied directly on the light source 20 (not shown).

In one embodiment, the light source 20 emits substantially blue light. Part of the blue light will be converted, for example, by using $Y_3Al_5O_{12}:Ce^{3+}$ (further also referred to as YAG:Ce) which converts part of the blue impinging light to yellow light. Choosing a specific density of the luminescent material 70 causes a predetermined part of the impinging blue light to be converted to yellow and determines the color of the light emitted by the luminaire 102, 104. The ratio of blue light which is converted by the luminescent material 70 may be determined, for example, by a layer thickness of the remote phosphor layer 70, or, for example, by a concentration of the YAG:Ce particles distributed in the remote phosphor layer 70. Alternatively, for example, CaS:$Eu^{2+}$ (further also referred to as CaS:Eu) may be used, which converts part of the blue impinging light to red light. Adding some CaS:Eu to the YAG:Ce may result in white light having an increased color temperature.

Alternatively, the light source 20 emits, for example, ultraviolet light which is converted by the luminescent material 70 to substantially white light. For example, a mixture of $BaMgAl_{10}O_{17}:Eu^{2+}$ (converting ultraviolet light to blue light), $Ca_8Mg(SiO_4)_4Cl_2:Eu^{2+},Mn^{2+}$ (converting ultraviolet light to green light), and $Y_2O_3:Eu^{3+},Bi^{3+}$ (converting ultraviolet light to red light) with different phosphor ratios may be used to choose a color of the light emitted from the luminaire 102, 104 in a range from relatively cold white to warm white, for example, between 6500K and 2700K. Other suitable luminescent materials 70 may be used to obtain a required color of the light emitted by the luminaire.

The luminaire 102, 104 may comprise a plurality of light sources 20 (not shown) each comprising a refractive collimator 30 (not shown), for example, arranged in a row (not shown) to illuminate at least a part of the illuminating surface 50, 52 in a substantially uniform way. A relatively large illuminating surface 50, 52 may be illuminated substantially uniformly by using a plurality of illumination systems 10. Generally, the shape of the exit window 40 of the individual refractive collimators 30 may have to be adapted so as to ensure that the light distribution across the illuminating surface 50, 52 remains substantially uniform, also at parts of the illuminating surface 50, 52 where the light of two or more light sources 20 overlaps.

Figure 3A:
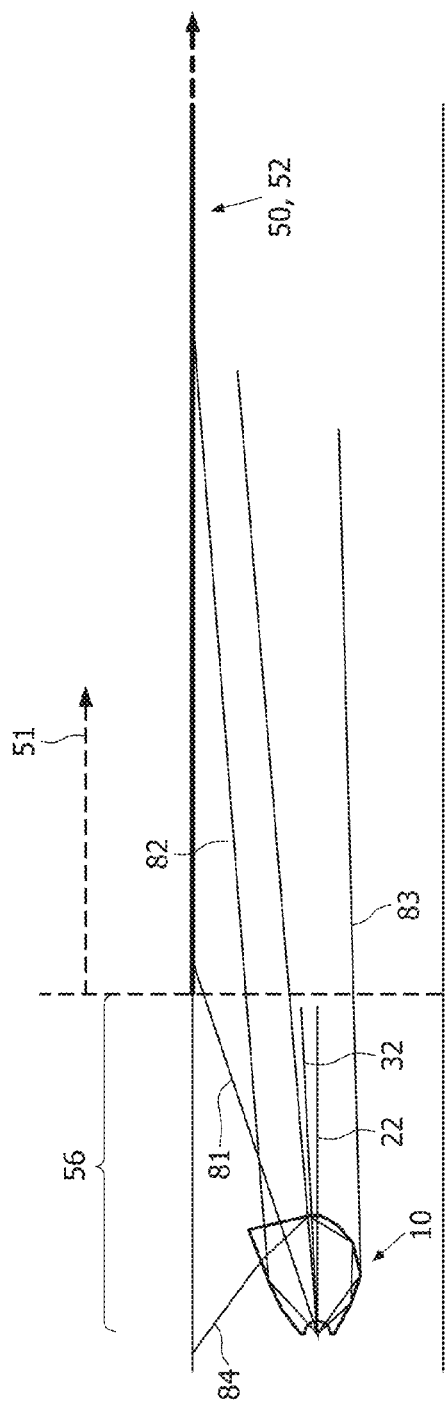
FIGS. 3A and 3B show a uniformity distribution across the illuminating surface by virtue of the illumination system according to the invention.
Figure 3B:
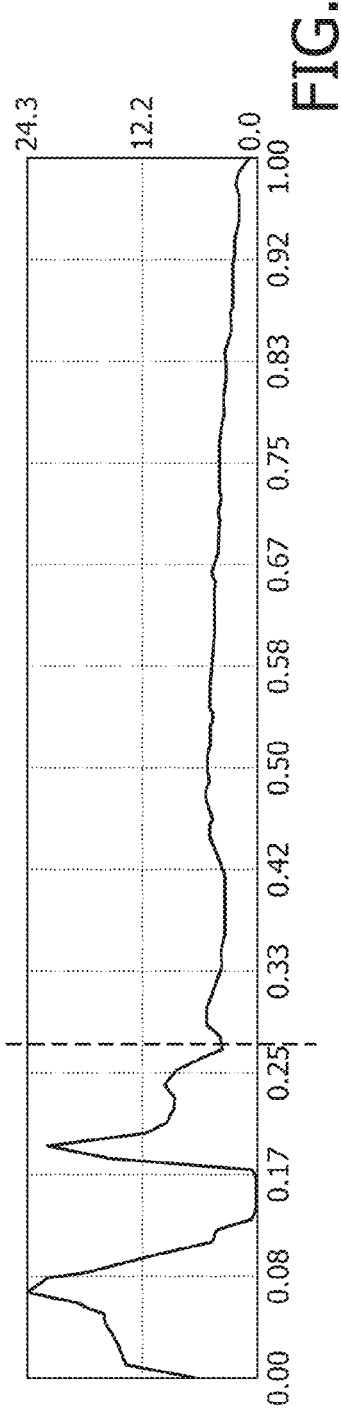

FIGS. 3A and 3B show a uniformity distribution across the illuminating surface 50, 52 by virtue of the illumination system 10 according to the invention. FIG. 3A shows the illumination system 10 arranged in a luminaire, and some of the light rays 81, 82, 83, 84 emitted by the light source 20. The light rays denoted by reference numerals 81, 82 and 83 are collimated and refracted in such a way that they impinge on the illuminating surface 50, 52 so as to generate a substantially uniformly illuminated part 51 of the illuminating surface 50, 52. The light ray denoted by reference numeral 81 is merely refracted at the first part 44 of the exit window 40 of the refractive collimator 30. The light ray denoted by reference numeral 82 is reflected from the edge wall 36 of the refractive collimator 30 via total internal reflection, after which the light ray is redirected towards the illuminating surface 50, 52. The light ray denoted by reference numeral 83 is refracted from the convexly shaped part 47 of the refractive collimator 30. FIG. 3A clearly shows that the shape of the convexly shaped part 47 of the exit window 40 of the refractive collimator 30 is chosen to be such that the light ray denoted by reference numeral 83 is redirected from a direction in which the light progresses away from the illuminating surface 50, 52 to a direction in which the light progresses towards the illuminating surface 50, 52. In such a way, the light emitted by the light source 20 and progressing in a direction away from the illuminating surface 50, 52 may be redirected by the curvature of the convexly shaped part 47 of the exit window 40 so that this light contributes to the illumination of the illuminating surface 50, 52. The exact shape of the convexly shaped part 47 of the exit window 40 may be determined by means of optical modeling software so that at least a part 51 of the illuminating surface 50, 52 is illuminated in a substantially uniform way.

The light ray denoted by reference numeral 84 is scattered multiple times inside the refractive collimator 30 and eventually leaves it at a surface different from the exit window 40. This light ray 84 represents stray light which may be used to illuminate a part of the illuminating surface 50, 52 which is arranged near the refractive collimator 30. In known illumination systems, the base of the light source is often arranged substantially parallel to the illuminating surface 50, 52, and the area 56 of the illuminating surface 50, 52 arranged underneath the base will thus not be illuminated as it is shielded by the base. In the illumination system 10 according to the invention, the base 24 is arranged substantially perpendicularly to the illuminating surface 50, 52 so that stray light may illuminate the part 56 near the illumination system 10, preventing dark areas on the illuminating surface 50, 52.

FIG. 3B shows an example of a light intensity distribution generated by the illumination system 10 according to the invention. The part 51 of the illuminating surface 50, 52 which is substantially uniformly illuminated is indicated by a dashed arrow. As can be seen from the plot shown in FIG. 3B, the light intensity distribution across the part 51 of the illuminating surface 50, 52 is substantially uniform. Furthermore, the area 56 of the illuminating surface 50, 52 near the illumination system 10 is illuminated via stray light. As for the distribution shown in FIG. 3B, additional measures are required to reduce the intensity at the area 56 near the illumination system 10 and to further improve the uniformity at this area 56.

FIGS. 4A and 4B show polar plots of the light distribution of the light-emitting diode 20 (FIG. 4A) and the light-emitting diode 20 in combination with the collimator 30 (FIG. 4B). The emission distribution of the light-emitting diode 20 as shown in FIG. 4A is a substantially Lambertian light distribution in which the orientation of the light-emitting diode 20 substantially coincides with the arrangement of the illustrated light-emitting diode 20 in FIG. 4A. Also the orientation of the refractive collimator 30 is shown in FIG. 4B, and the light distribution shown in the polar plot of FIG. 4B corresponds to this orientation. The illuminating surface 50, 52 (only part of the illuminating surface 50 is shown in FIG. 4B) is arranged in the upper right quadrant of the polar plot shown in FIG. 4B and may be either a light-reflective surface 50, which subsequently reflects the impinging light towards the light emission window 60 (see FIG. 2A), or at least a part of the light emission window 60 (see FIG. 2B). Due to the combination of the light-emitting diode 20 and the refractive collimator 30, the substantially Lambertian light distribution (of FIG. 4A) is converted to a distribution in which the illuminating surface 50, 52 is illuminated in a substantially homogeneous way. As can be seen from the polar plot of FIG. 4B, the convex part 47 (see FIG. 1) of the refractive collimator 40 redirects light which is emitted by the light-emitting diode 20 in a direction away from the illuminating surface 50, 52 (lower right quadrant of the polar plot of FIG. 4A), and is now redirected towards the illuminating surface 50, 52 (being the upper right quadrant of the polar plot of FIG. 4B).

Figure 5:
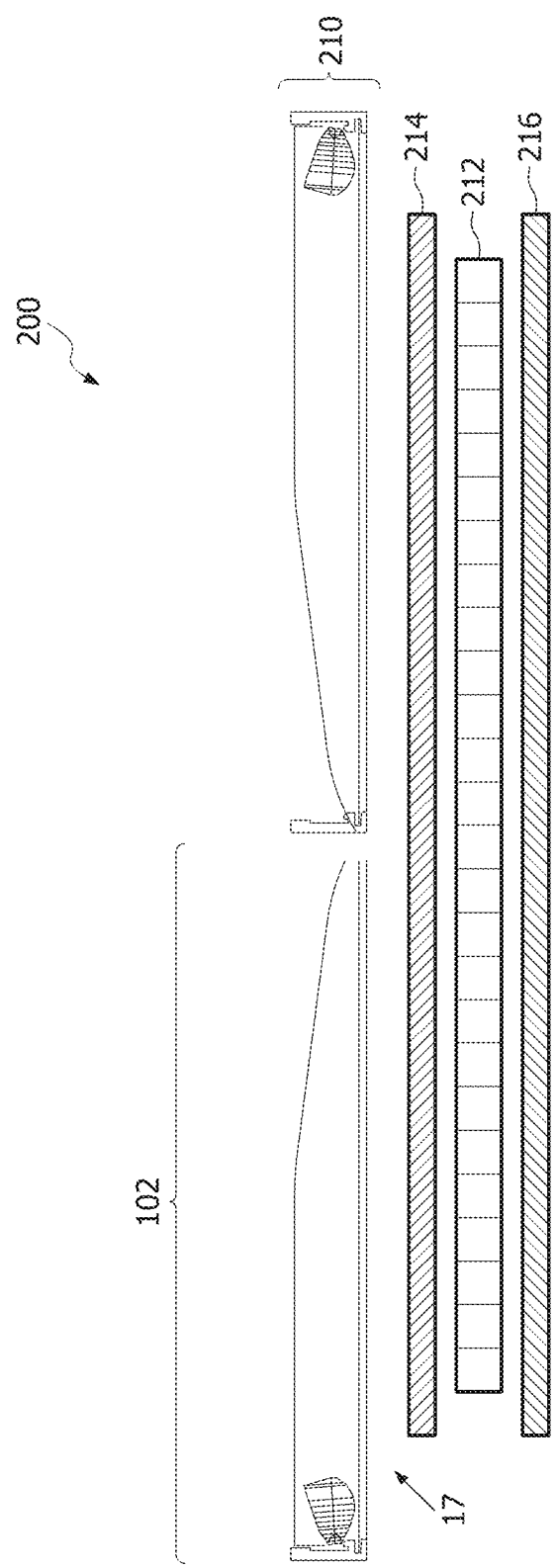
FIG. 5 is a schematic cross-sectional view of a display device according to the invention, comprising the luminaire as a backlighting system.

FIG. 5 is a schematic cross-sectional view of a backlighting system 210 and a display device 200 according to the invention. The display device 200 may be, for example, a liquid crystal display device 200 which comprises a layer of electrically connected (not shown) liquid crystal cells 212, a polarizing layer 214, and an analyzing layer 216. Alternatively, the display device 200 may be any other non-emissive display device 200.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or an preceding an element does not exclude the presence of a plurality of such elements. The invention may be implemented by means of hardware comprising several distinct elements. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. An illumination system comprising:
a light source for emitting light with a basic emission distribution around a symmetry axis, and
a collimator for redirecting light from the light source to substantially homogeneously illuminate at least a part of an illuminating surface, at least a section of the homogeneously illuminated illuminating surface extending substantially parallel to the symmetry axis, the collimator comprising a concave input window for receiving light from the light source, and further comprising an at least partially convex output window for directing light towards the illuminating surface, a convex part of the output window being shaped for refracting light emitted by the light source in a direction away from the illuminating surface towards the illuminating surface and for generating an altered emission distribution being asymmetric with respect to the symmetry axis of the basic emission distribution to substantially homogeneously illuminate the at least part of the illuminating surface, and a second part of the output window that is flatter than the convex part, is disposed closer to the part of the illuminating surface than the convex part, and is configured to refract light emitted by the light source to a portion of the part of the illuminating surface that is closer to the collimator than a portion of the part of the illuminating surface to which the convex part directs light from the light source.

2. The illumination system as claimed in claim 1, wherein the collimator comprises an edge-wall arranged between the input window and the output window, in between the input window and a boundary edge the edge-wall being arranged substantially symmetric around a further symmetry axis, and comprising a substantially parabolic shape in a cross-section through the further symmetry axis.

3. The illumination system as claimed in claim 2, wherein the further symmetry axis of the collimator and the symmetry axis of the emission distribution intersect substantially at a focal point of the concave input window, and wherein the further symmetry axis is tilted with respect to the symmetry axis of the emission distribution over a tilting angle.

4. The illumination system as claimed in claim 3, wherein the further symmetry axis is tilted with respect to the symmetry axis towards the illuminating surface, and wherein the tilting angle between the further symmetry axis and the symmetry axis is in a range between 0.5 degrees and 10 degrees.

5. The illumination system as claimed in claim 2, wherein the second part of the output window comprises a substantially planar part of the output window, the second part being arranged substantially between a first plane and the illuminating surface, the first plane extending through the further symmetry axis and being arranged substantially perpendicular to a second plane extending through the symmetry axis of the emission distribution and the further symmetry axis, and wherein the convex part is arranged on an opposite side of the first plane compared to the illuminating surface.

6. The illumination system as claimed in claim 5, wherein the output window is substantially symmetric relative to the second plane extending through the symmetry axis of the emission distribution and the further symmetry axis.

7. A luminaire comprising an illumination system as claimed in claim 1, and comprising the illuminating surface.

8. The luminaire as claimed in claim 7, wherein the luminaire comprises a plurality of illumination systems, each comprising a light source and a collimator for illuminating a part of the illuminating surface, the plurality of illumination systems together are arranged for illuminating the illuminating surface substantially homogeneously.

9. The luminaire as claimed in claim 8, wherein the plurality of light sources are arranged in a row of light sources, and wherein individual parts illuminated by the respective illumination systems partially overlap, the distribution of the light of the respective illumination systems being arranged for generating a substantially uniform light distribution across the illuminating surface.

10. The luminaire as claimed in claim 7, wherein a part of the illuminating surface is a curved surface being concavely shaped with respect to the collimator.

11. The luminaire as claimed in claim 7, wherein the illuminating surface is a reflective surface arranged substantially opposite a light emission window of the luminaire.

12. The luminaire as claimed in claim 7, wherein the luminaire comprises a light emission window comprising the illuminating surface.

13. The luminaire as claimed in claim 7, wherein the illuminating surface and/or the light emission window comprise a luminescent material for converting at least a part of the light emitted by the light source into light of a different color.

14. A collimator for use in the illumination system as claimed in claim 1.

15. A display device comprising the luminaire as claimed in claim 7 for use as a backlighting system.

16. The illumination system as claimed in claim 1, wherein the second part is disposed at a non-zero angle with respect to the at least a section of the homogeneously illuminated illuminating surface.

17. The illumination system as claimed in claim 16, wherein the second part is substantially planar.

18. The illumination system as claimed in claim 17, wherein the light refracted by the second part is received directly from the input window.

* * * * *